United States Patent [19]
Robuck

[11] Patent Number: 5,991,367
[45] Date of Patent: Nov. 23, 1999

[54] TELEPHONE CALL SCREENER

[76] Inventor: Greg Robuck, 10135 Hedgeway Dr., Dallas, Tex. 75229

[21] Appl. No.: 09/172,565

[22] Filed: Oct. 14, 1998

Related U.S. Application Data

[60] Provisional application No. 60/062,067, Oct. 15, 1997.

[51] Int. Cl.⁶ .................................................. H04M 1/64
[52] U.S. Cl. ........................... 379/88.24; 379/77; 379/80; 379/88.01; 379/196; 379/199; 379/210
[58] Field of Search .............................. 379/67.1, 71, 77, 379/81, 88.16, 88.21, 88.23, 88.28, 80, 88.01, 196, 199, 210

[56] References Cited

U.S. PATENT DOCUMENTS

| | | | |
|---|---|---|---|
| 4,439,638 | 3/1984 | Seligsohn et al. . | |
| 4,459,435 | 7/1984 | Foldvary et al. . | |
| 4,813,070 | 3/1989 | Humphreys et al. | 379/213 |
| 4,922,526 | 5/1990 | Morganstein et al. | 379/157 |
| 4,982,420 | 1/1991 | Theis . | |
| 5,029,198 | 7/1991 | Walpole et al. | 379/88.23 |
| 5,031,205 | 7/1991 | Phillips . | |
| 5,189,692 | 2/1993 | Ferrara | 379/88.16 |
| 5,228,080 | 7/1993 | Nutter et al. . | |
| 5,249,219 | 9/1993 | Morganstein et al. | 379/84 |
| 5,327,486 | 7/1994 | Wolff et al. | 379/93.23 |
| 5,347,574 | 9/1994 | Morganstein . | |
| 5,351,289 | 9/1994 | Logsdon et al. . | |
| 5,361,295 | 11/1994 | Solomon et al. | 379/67.1 |
| 5,375,161 | 12/1994 | Fuller et al. | 455/417 |
| 5,502,761 | 3/1996 | Duncan et al. | 379/142 |
| 5,511,111 | 4/1996 | Serbetcioglu et al. . | |
| 5,535,264 | 7/1996 | Starr et al. | 379/88.25 |
| 5,546,442 | 8/1996 | Foladare et al. | 455/417 |
| 5,548,636 | 8/1996 | Bannister et al. . | |
| 5,563,935 | 10/1996 | Small . | |
| 5,581,604 | 12/1996 | Robinson et al. | 379/88.13 |
| 5,581,611 | 12/1996 | Unoki | 379/211 |
| 5,631,951 | 5/1997 | Chen . | |
| 5,651,055 | 7/1997 | Argade . | |
| 5,696,809 | 12/1997 | Voit | 379/5 |
| 5,703,935 | 12/1997 | Raissyan et al. | 379/88.18 |
| 5,724,408 | 3/1998 | Morganstein | 379/88.2 |
| 5,793,858 | 8/1998 | Meubus et al. | 379/210 |
| 5,832,060 | 11/1998 | Corlett et al. | 379/88.19 |
| 5,832,062 | 11/1998 | Drake | 379/88.16 |

*Primary Examiner*—Krista Zele
*Assistant Examiner*—Roland G. Foster
*Attorney, Agent, or Firm*—Burleigh & Associates; Roger S. Burleigh

[57] ABSTRACT

A telephone call screener and method of use is disclosed for use with a user's telephone system. It rejects unwanted telephone calls, such as those from telemarketers, while still allowing personal calls to ring through to the user, all without any user involvement. The screener recognizes an incoming call and disconnects the user's telephone. The screening process then reads prerecorded messages to the caller, attempting to verbally filter out and reject undesired call types. In a first embodiment, the screener generates a random single digit number, and requests the caller to press this number key on their phone to verify compliance with the previously read message. Depending on the caller's actions, the call is either disconnected, or is allowed to ring through to the user's telephone. Neither the caller nor the screener user needs to know any predefined codes. Further, the screener does not depend on any Caller ID system or telephone answering machine. In alternate embodiments, the screener could be implemented in a business telephone system, or at a telephone company.

18 Claims, 3 Drawing Sheets

TELEPHONE CALL SCREENER

CROSS REFERENCE TO RELATED APPLICATIONS

This invention was filed in a Provisional Patent Application on Oct. 15, 1997. It was issued application number 60/062,067.

BACKGROUND

FIELD OF INVENTION

This invention relates to telephone call screeners, specifically to such screeners that are used to reject unwanted telephone calls. Unlike most telephone answering machines, my telephone call screener does not include or control any recording device. It does, however, contain a Read Only Memory (ROM) for playback of prerecorded messages.

Definitions

In this document, the following definitions shall apply. "Screener" is an electronic device attached to a telephone system at a home, business, or telephone company used to reject unwanted calls that would have been received by the called party. "Caller" is the party placing the call that is attempting to reach the called party. "User" is the called party using the screener to reject unwanted calls.

3. Description of Prior Art

For many years, people have been dependent on one of the greatest inventions of all time—the telephone. A major complaint about the telephone is the seemingly endless barrage of unwanted calls. Examples are calls from salespeople, telemarketers, and solicitors.

Many attempts to end these unwanted calls have been tried. Unlisted numbers have been used, but have proven unsuccessful against determined telemarketers. Some people occasionally unplug their telephone, with the obvious disadvantage of not receiving important personal calls. Others have used an answering machine (typically with a built-in recorder) to listen to the incoming call prior to answering it, but this isn't much better, as they must still listen to calls to screen them Some people just hang up on the caller. Hanging up the telephone during a call doesn't necessarily prevent the caller from calling back again. Some sales agencies use long prerecorded messages, sometimes controlled by a computer, without any human involvement on the caller end. Often, these will continue to call back periodically, subjecting people to frustrating harassment, in spite of their hanging up on the caller each time.

Other attempts to end unwanted calls have used technology, including patented inventions. Many of these patented call screeners require the caller to use a preselected code (of one or more digits) along with the dialed telephone number (eg., U.S. Pat. No. 5,563,935, Small and U.S. Pat. No. 4,850,013, Rose). Without the code, the called telephone won't ring. Although this may eliminate some unwanted calls, the disadvantage is that it would also prevent other desirable calls. This would include anyone who didn't know the code, such as possibly distant friends or relatives, school personnel, doctors, or emergency services. The same problem exists for those inventions that screen calls by employing a database of "approved" telephone numbers. A similar problem exists for other patented inventions of a telephone circuit that silences a preset number of rings prior to allowing actual ringing (e.g, U.S. Pat. No. 4,459,435, Foldvary et al.). Legitimate callers that were unaware of this setup may not get through Caller ID service is another patented invention (e.g, U.S. Pat. No. 5,228,080, Nutter et al.) used to screen calls. However, Caller ID works only on local calls, as some out-of-state calls do not send their telephone number to the Caller ID unit. Even for local calls, screening still requires manual viewing of the caller telephone number during the call to determine if it should be answered. In addition, callers may "block out" their telephone number, rendering Caller ID useless.

OBJECTS AND ADVANTAGES

The present invention is a telephone call screener that will overcome the aforementioned drawbacks. The main objective of my telephone call screener is to eliminate unwanted telephone calls, while still allowing desirable calls.

It is a further objective of my telephone call screener to screen out unwanted calls automatically without having any user involvement in the process. The advantage is that it allows the user to avoid actions such as pressing buttons, using pre-established codes or keys, or having to enter data into telephone lists. It also avoids requiring the user to listen to incoming calls to screen them, or to make any decisions about accepting the call.

It is a still further objective of my telephone call screener to allow callers to go through the screening process without having to know any pre-established codes or keys.

It is a still further objective of my telephone call screener to screen out those telephone calls that use prerecorded messages that are played to the caller.

It is a still further objective of my telephone call screener to screen calls without requiring the user to enter "allowable" or "approved" telephone numbers into a user database.

It is a still further objective of my telephone call screener to screen out calls without the use of Caller ID service or equipment.

It is a still further objective of my telephone call screener, in one embodiment, to require the caller to use a voice response (such as saying "hello") to verify that the caller is prepared to listen to a prerecorded message.

It is a still further objective of my telephone call screener, in one embodiment, to require the caller to verify agreement to the played message, prior to allowing the call to ring through to the user.

Further objects and advantages of my telephone call screener may become apparent from a consideration of the drawings and ensuing description.

DRAWING FIGURES

A better understanding of my telephone call screener may be gained by reading the following detailed description, along with the accompanying drawings, in which.

Figure 1:
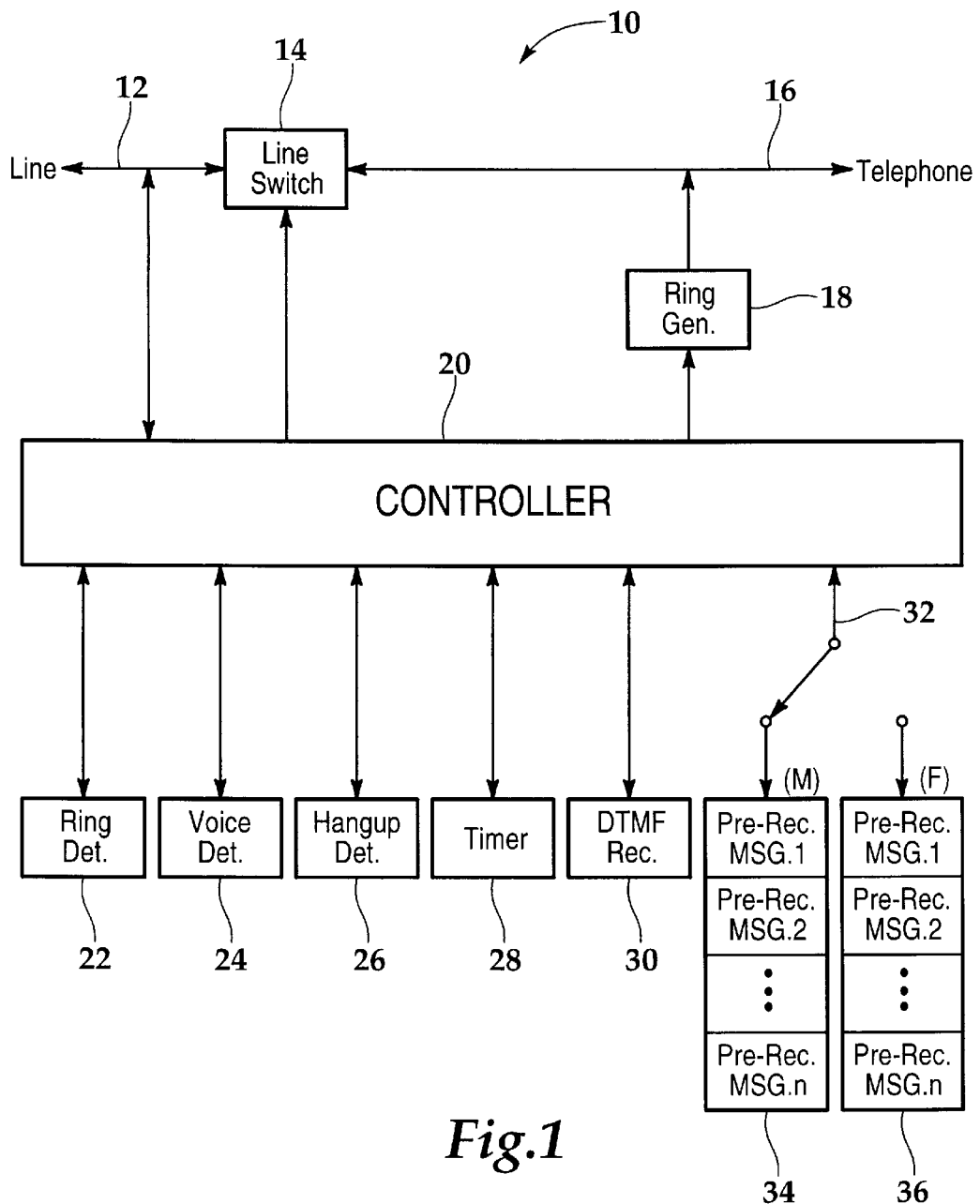
FIG. 1 is a block diagram of the system components.

REFERENCE NUMERALS IN DRAWINGS 10 telephone call screener
12 telephone line
14 line switch
16 telephone
18 ring generator
20 screener controller circuitry -continued 22 ring detection circuitry
24 voice detection circuitry
26 hangup detection circuitry
28 countdown timer circuitry
30 Dual Tone Multi-Frequency (DTMF) receiver
32 voice gender selection switch
34 prerecorded message table, male voice
36 prerecorded message table, female voice

SUMMARY

A telephone call screener installed in a user's telephone line screens out unwanted telephone calls, while allowing desired personal calls to ring through. It performs this function with the use of electronic circuitry, a controller, and prerecorded messages. It operates in stand-alone fashion, without any user involvement

DETAILED DESCRIPTION OF A PREFERRED EMBODIMENT OF THE PRESENT INVENTION

A typical embodiment of my telephone call screener is illustrated in FIG. 1, showing the system components. A call screener 10 is electrically connected between an incoming telephone line 12 and a telephone 16 (or answering machine). Line 12 is connected to a controller 20. Controller 20 is connected to two other components that also connect to telephone 16. These are a line switch 14 and a ring generator 18. Controller 20 also has connections to six other components that perform the screening functions: a ring detector 22, a voice detector 24, a hangup detector 26, a timer 28, a Dual Tone Multi-Frequency (DTMF) receiver 30, and a pair of message tables 34 and 36. Only one message table (either table 34 or table 36) at a time is connected to the controller 20, through a switch 32.

Controller 20 is implemented as a microprocessor or other type of electronic state controller capable of processing real-time signals. It controls line switch 14, a digital switch. When line switch 14 is not active, incoming line 12 is connected to telephone 16 in a normal fashion. When line switch 14 is activated, it interrupts the line 12 connection to telephone 16. Either way, controller 20 always has a connection to incoming line 12. Regardless of the state of line switch 14, controller 20 can activate ring generator 18, causing a ring signal at telephone 16.

At the start of a normal cycle, ring detector 22 is connected through controller 20 to line 12, awaiting an incoming ring signal from a caller. Ring detector 22 is identical to those circuits implemented in answering machines and fax machines. When it detects an incoming ring signal, it generates a signal back to controller 20.

Voice detector 24 works similarly to ring detector 22. Voice detector 24 is connected through controller 20 to line 12. When it detects a voice from the caller on line 12, it generates a signal back to the controller.

In a similar fashion, hangup detector 26 is connected through controller 20 to line 12, and generates a signal back to controller 20 when it detects that the caller on line 12 has hungup their telephone.

Timer 28 is a standard countdown timer, connected through controller 20. Controller 20 sends a countdown time quantity (typically several seconds) to the timer, and starts it counting down. When the countdown time quantity has expired, timer 28 generates a signal back to controller 20.

DTMF receiver 30 is connected through controller 20 to line 12. It operates in a standard fashion, converting received line tone frequencies to discrete decimal values that can be read by the controller.

Message tables 34 and 36 are connected to controller 20 through switch 32, so that only one message table (either table 34 or table 36) at a time is connected to controller 20. The tables each have one or more stored verbal messages, limited only by the size of the Read Only Memory (ROM) chips used. Typical messages include such phrases as "Hello?", "Please put us on your no-call list", and "We do not accept sales calls". Message tables 34 and 36 contain identical messages, in different gender voices. Message table 34 has all its messages spoken in a male voice, while message table 36 has all its messages spoken in a female voice. Thus, the user of screener 10 selects which type of voice they prefer by using switch 32.

Operation

The general operation of my call screener is as follows. When an incoming telephone call begins to ring the user's telephone, the screener interrupts the ring. It then seizes the incoming line. It reads one or more prerecorded messages to the caller, attempting to screen the call. Other optional screening processes may occur. In most cases, the call would then be allowed to ring through to the user's telephone, and the call would be completed.

The telephone call screeners described below are two specific examples of the typical embodiment, intended to be implemented as a home consumer product. The screener would be an external box to the telephone in most embodiments. In others, it could be incorporated into the telephone. However, other embodiments are numerous, and would include implementation as a business product, or as equipment at a telephone company, providing a screener service to their customers. Regardless of the application envisioned, the basic functions and processing described in this patent application would still apply.

Figure 2:
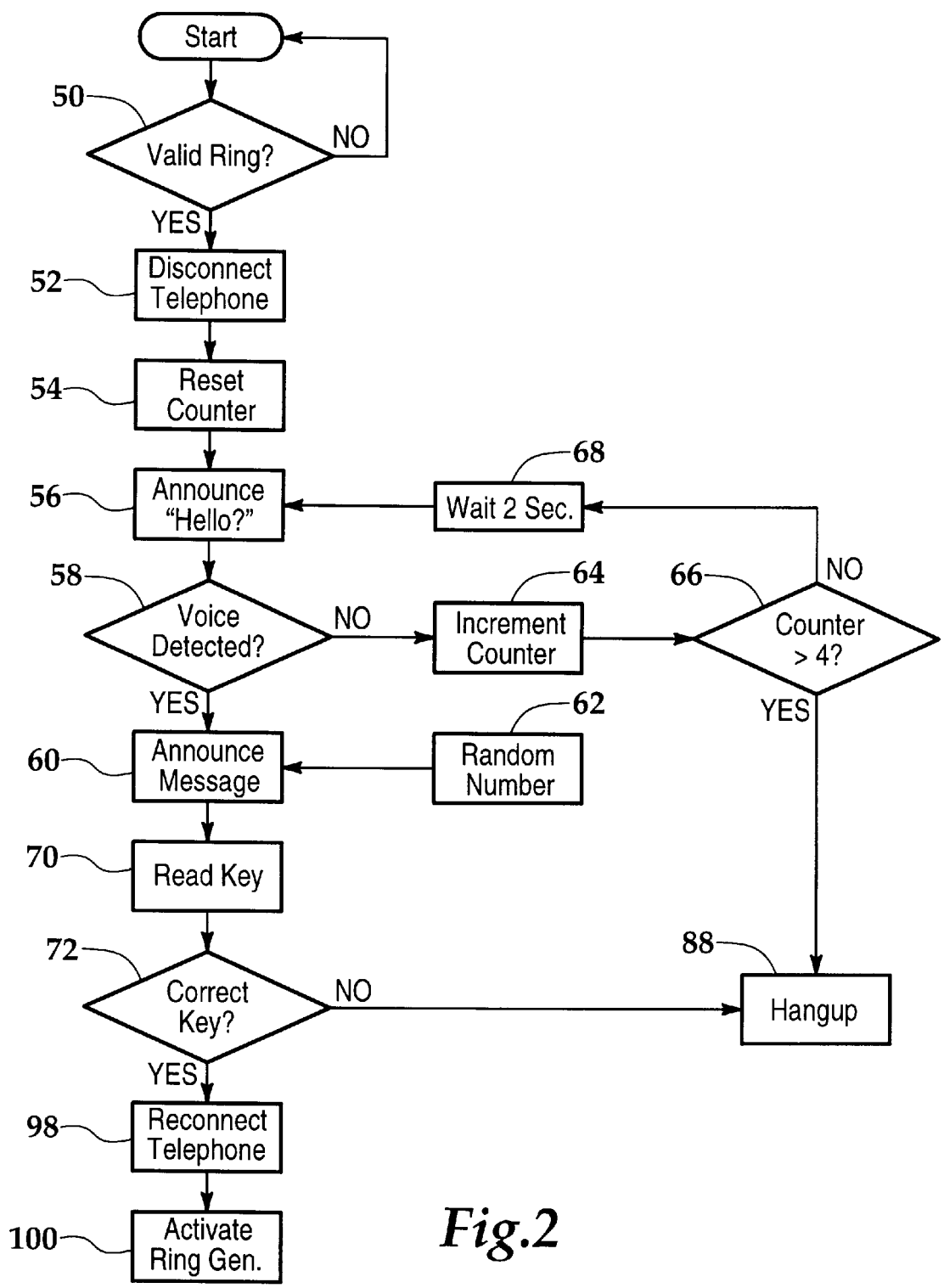
FIG. 2 is a flowchart illustrating the operation of a first preferred embodiment of my telephone call screener.
Figure 3:
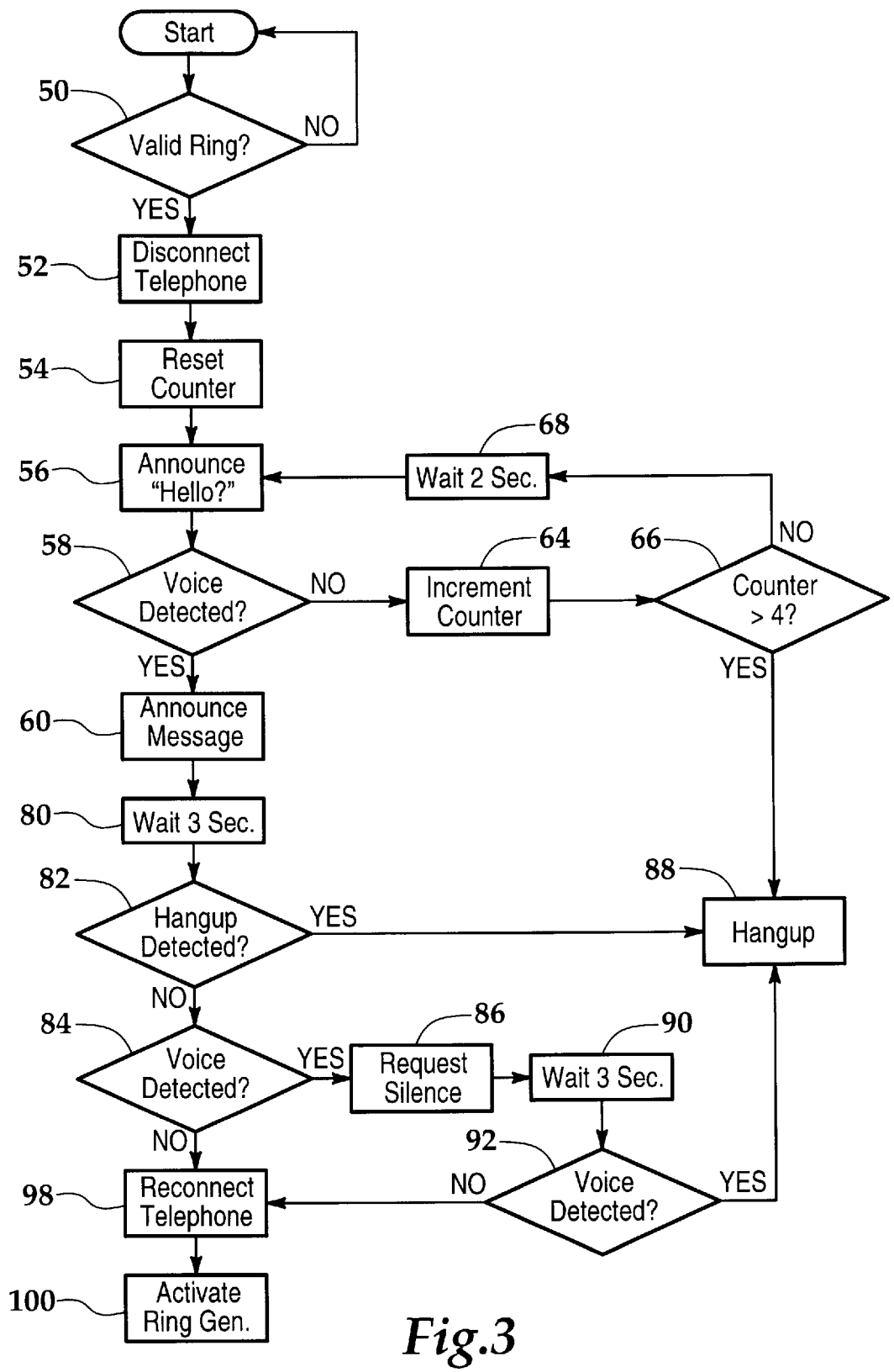
FIG. 3 is a flowchart illustrating the operation of a second preferred embodiment of my telephone call screener.

The detailed operation of my telephone call screener may be more readily understood by viewing the flowcharts shown in FIGS. 2 and 3.

Operation—First Preferred Embodiment

A first preferred embodiment is illustrated in FIG. 2. Normally, screener 10 will be in a standby mode, waiting for a ring from an incoming call on line 12, as shown in process 50. When a telephone call begins to ring the user's telephone, process 52 indicates that controller 20 will intercept the ring using line switch 14, by disconnecting the connection to telephone 16, thus seizing the call. After initializing a counter to the value 0 in process 54, the phone call is answered with a "Hello?" message from message table 34 or 36, shown as process 56. This may be in either a male voice or a female voice, depending on which position of switch 32 the user has previously selected Process 58 then listens for any voice response from the caller by use of voice detector 24, such as an answer of "Hello". If a voice is not detected, the flowchart indicates that controller 20 will continue answering "Hello?" approximately every 2 seconds, for a total of up to 5 times. This loop, waiting to detect a caller voice response, is shown through processes 56, 58, 64, 66, and 68. After 5 attempts to answer, if no caller voice response is detected, then controller 20 will hang up on the caller, as shown in process 88. Controller 20 would then need to reset any necessary circuits to be ready for the next call.

If a caller voice response is detected in process 58 of FIG. 2, then controller 20 announces another message from message table 34 or 36, as shown in process 60. This would be a screening message, such as "If this call is from a telemarketer, salesperson, or solicitor, please hang up, and do not call here ever again. If this call is from a family member or a personal friend, please press the (X) key now." The (X) key is a RANDOMLY selected digit from 0–9 (generated by controller 20), and must be entered by the caller to verify agreement to the previous message. It is selected at random in process 62, and supplied to process 60 to be announced as part of the previous screening message (i.e., "... please press the 7 key now ..."). Process 70 shows that controller 20 then reads the key pressed by the caller. DTMF receiver 30 converts this to a decimal value, which is read by controller 20. Process 72 shows that controller 20 tests if the correct key was pressed If not, controller 20 hangs up on the caller, as shown in process 88. However, if the correct key was pressed, then controller 20 signals line switch 14 to reconnect telephone line 12 back to telephone 16, as seen in process 98. Controller 20 then activates ring generator 18, as shown in process 100, causing telephone 16 to ring At this point, the call has been effectively screened, the user will hear the phone ring, and may answer it, expecting that it is a personal call. After the call is complete, controller 20 would then need to reset any necessary circuits to be ready for the next call.

Note that the caller does not need to know any preselected code prior to calling This is an important difference from previous screeners. Note that each new incoming phone call would most likely generate a different verification code in process 62, since the process is random Note also that my telephone call screener is not related to phone mail systems, as it does not offer multiple numbered paths to different options, but instead simply requires the use of the verification key by the caller to indicate that they are complying with the screening message. Another note is that my telephone call screener will screen out incoming prerecorded messages, as they would likely not respond correctly to the request to press a particular key in process 60.

Operation—Second Preferred Embodiment

A second preferred embodiment is illustrated in FIG. 3. It differs from the first preferred embodiment, in that it does not require the caller to verify compliance with the announced message by pressing a key. Instead, it adds additional processes to assist in the rejection of unwanted messages.

Normally, screener 10 will be in a standby mode, waiting for a ring from an incoming call on line 12, as shown in process 50. When a telephone call begins to ring the user's telephone, process 52 indicates that controller 20 will intercept the ring using line switch 14, by disconnecting the connection to telephone 16, thus seizing the call After initializing a counter to the value 0 in process 54, the phone call is answered with a "Hello?" message from message table 34 or 36, shown as process 56. This may be in either a male voice or a female voice, depending on which position of switch 32 the user has previously selected Process 58 then listens for any voice response from the caller by use of voice detector 24, such as an answer of "Hello". If a voice is not detected, the flowchart indicates that controller 20 will continue answering "Hello?" approximately every 2 seconds, for a total of up to 5 times. This loop, waiting to detect a caller voice response, is shown through processes 56, 58, 64, 66, and 68. After 5 attempts to answer, if no caller voice response is detected, then controller 20 will hang up on the caller, as shown in process 88. Controller 20 would then need to reset any necessary circuits to be ready for the next call.

If a caller voice response is detected in process 58 of FIG. 2, then controller 20 announces another message from message table 34 or 36, as shown in process 60. This would be a screening message, such as "If this call is from a telemarketer, salesperson, or solicitor, please hang up, and do not call here ever again. If this call is from a family member or a personal friend, please wait a moment". Process 80 shows that controller 20 then waits about 3 seconds, using timer circuit 28. Process 82 then tests if the caller has hung up, using hangup detector 26. If so, controller 20 also hangs up, as shown in process 88. However, if the caller has not hung up, then process 84 shows that voice detector 24 will determine if a voice is present on line 12, as would occur when the incoming call was a prerecorded message. If so, controller 20 would announce another message from message tables 34 or 36 requesting silence for several seconds, as shown in process 86. The controller uses timer 28 to countdown about 3 seconds, shown as process 90. In process 92, voice detector 24 will again determine if a voice is present on line 12, as would continue to occur if the incoming call was a prerecorded message. If so, controller 20 hangs up on the caller, in process 88. However, if no voice was detected in process 92, then it can be assumed that the voice detected earlier in process 84 was indeed a real person who is now complying with the request to be silent, and, therefore, not a prerecorded message. In this case, the call will be allowed to ring through Controller 20 signals line switch 14 to reconnect telephone line 12 back to telephone 16, as seen in process 98. Controller 20 then activates ring generator 18, as shown in process 100, causing telephone 16 to ring. At this point, the call has been effectively screened, the user will hear the phone ring, and may answer it, expecting that it is a personal call. After the call is complete, controller 20 would then need to reset any necessary circuits to be ready for the next call.

Summary, Ramifications, and Scope of Invention

Accordingly, the reader will see that this telephone call screener will eliminate unwanted telephone calls, while still allowing desirable calls. It works automatically without having any user involvement in the process, which is a huge advance over the current state-of-the-art screeners. Regardless of the embodiment chosen, the user is never required to press buttons, use preestablished codes or keys, listen to incoming calls to screen them, or to make any decisions about accepting the call. Furthermore, the screener has additional advantages, in that

- it allows callers to go through the screening process without having to know any pre-established codes or keys;
- it screens calls without requiring the user to enter "allowable" or "approved" telephone numbers or lists into a user database;
- it rejects calls that use prerecorded messages that are played to the caller, and
- it screens calls without the use of Caller ID service or equipment.

Although the descriptions above contain many specifics, these should not be construed as limiting the scope of the screener, but merely providing illustrations of some of the presently preferred embodiment & Obviously, many types of small changes could produce many other embodiments, including small changes to the circuits and connections discussed above. One such change would be to eliminate the prerecorded messages, and instead, allow the user to record their own screening messages to be read to the caller during screening. Another such change would be to give the caller an option to leave a brief message on an optional message recorder if the caller was a telemarketer or salesperson. Another option would be to add an LED display to indicate when screening was active, to prevent the user from picking up the phone during that time. A separate display could indicate the number of successful screenings since the display was last reset. The screener could reside inside a telephone or answering machine, or could exist in call handling equipment at a telephone company. Other changes may become apparent to the reader upon consideration of the possible uses of my call screener. Regardless of the embodiment envisioned, the basic functions and processing described in this patent application would still apply.

I claim:

1. A telephone call screener comprising:
   means for detecting an incoming telephone call;
   means for seizing said call and disconnecting a called telephone from a telephone line;
   means for generating a random number;
   means for playing a message to a caller before said called telephone user answers said called telephone, said message identifying said random number;
   means for detecting said callers response to said message;
   means for reconnecting said called telephone to said telephone line as a function of said caller's response; and
   means for ringing said called telephone if said caller's response includes said random number.

2. The telephone call screener of claim 1, wherein said random number comprises a single digit number.

3. The telephone call screener of claim 2, wherein said means for detecting said caller's response to said message comprises means for identifying a key pressed on said caller's telephone and means for comparison of said key to said random number.

4. The invention of claim 1 wherein said telephone call screener comprises means for detecting a hangup from said caller.

5. The invention of claim 1 wherein said telephone call screener comprises means for varying said stored message voice type.

6. The invention of claim 5 wherein said telephone call screener comprises means for selecting between male and female stored message voice gender.

7. A system for blocking the connection of calls from a calling party device to a called party device, said system comprising;
   a controller;
   an incoming call detector;
   a random number generator, said random number generator operative to randomly select a number when said incoming call detector detects an incoming call; and
   a signal detector, said controller operative, upon said incoming call detector detecting an incoming call, to a) couple said incoming call from said calling party device to said signal detector, and, if said signal detector receives a signal from said calling party device corresponding to said number, to b) couple said calling party device to said called party device, said system thereby blocking connection of said incoming call unless a user of said calling party device inputs said number.

8. The system recited in claim 7, wherein said number comprises a single digit number.

9. The system recited in claim 7, wherein said signal comprises a Dual-Tone Multi-Frequency (DTMF) signal and said signal detector comprises a circuit for identifying a key pressed on said caller's telephone associated with DTMF signal.

10. The system recited in claim 7, wherein said system is coupled intermediate to said called party device and said calling party device.

11. The system recited in claim 7, further comprising a voice detector, and wherein said incoming call detector couples said incoming call to said signal detector only if said voice detector first receives a voice response from a user of said calling party device.

12. A call screening device comprising:
   a controllable switch intermediate to first and second devices coupled to a telecommunications network;
   a controller coupled to said controllable switch, said controller operative to detect an incoming call to said second device from said first device;
   a random number generator, said random number generator operative to randomly select a number when said controller detects an incoming call; and
   a signal detector, said controller operative, upon detecting an incoming call, to cause said controllable switch to a) decouple said second device from said telecommunications network and couple said incoming call from said first device to said signal detector and, if said signal detector receives a signal from said first device corresponding to said number, to b) couple said first device to said second device, said call screening device thereby blocking connection of said incoming call to said second device unless a user of said first device inputs said number.

13. The call screening device recited in claim 12, wherein said number comprises a single digit number.

14. The call screening device recited in claim 12, wherein said signal comprises a Dual-Tone Multi-Frequency (DTMF) signal and said signal detector comprises a circuit for identifying a key pressed on said caller's telephone associated with DTMF signal.

15. The call screening device recited in claim 12, further comprising a voice detector, and wherein said controller couples said incoming call to said signal detector only if said voice detector first receives a voice response from a user of said calling party device.

16. A method for screening telephone calls, said method comprising the steps of:
   detecting an incoming call to a called telephone;
   disconnecting said called telephone from a telephone line;
   generating a random number;
   playing a message to the calling party associated with said incoming call, said message identifying said random number;
   a detecting said calling party's response to said message;
   reconnecting said called telephone to said telephone line as a function of said caller's response; and
   ringing said called telephone if said calling party's response includes said random number.

17. The method recited in claim 16, wherein said step of detecting said calling party's response comprises the steps of identifying a key pressed on said calling party's telephone and comparing said key to said number.

18. The method recited in claim 16, further comprising the step of coupling said incoming call to said signal detector only upon receipt of a voice response from said calling party.

* * * * *